March 12, 1935.     R. S. JOHNSTON     1,993,931
FERROUS WELDING ELECTRODE
Filed Oct. 28, 1932
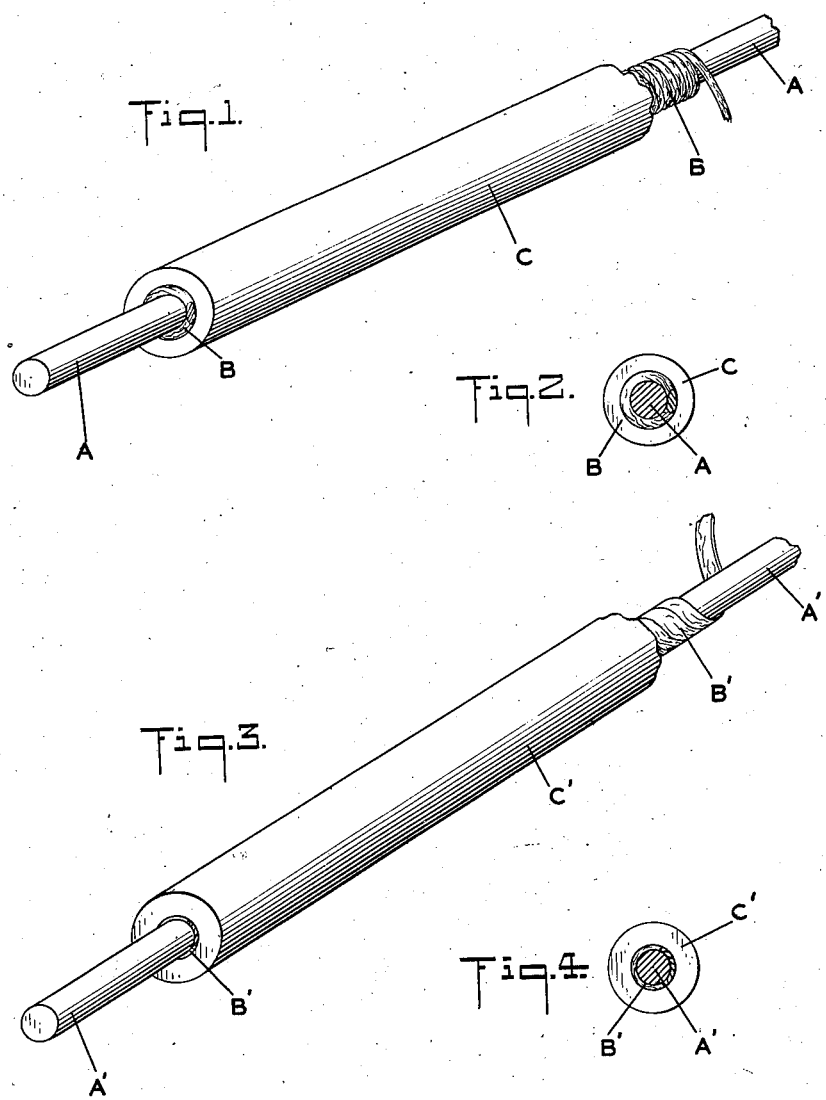
INVENTOR
Robert S. Johnston
BY Philipp Sawyer Rice
 + Kennedy
ATTORNEYS Patented Mar. 12, 1935

1,993,931

UNITED STATES PATENT OFFICE 1,993,931

FERROUS WELDING ELECTRODE

Robert S. Johnston, Yardley, Pa., assignor to John A. Roebling's Sons Company, Trenton, N. J., a corporation of New Jersey Application October 28, 1932, Serial No. 640,020

7 Claims. (Cl. 219—8)

This invention relates to a ferrous welding electrode for arc-welding.

The object of the invention is to provide an electrode which will give a deposit of ferrous weld-metal having substantially the same composition, density and homogeneity as the metal of the welding rod and less hard, and therefore more like annealed metal, than has heretofore been the case with weld-metal, this difference in hardness being due to the superior heat insulating properties of the slag, as more fully explained hereinafter. With the present invention the percentage composition of the weld-rod may differ to some extent from that of the deposited weld-metal, particularly as to iron oxide, carbon, phosphorous, sulphur, or silicon, and yet the deposited weld-metal will be refined so as to lessen the amount of such oxidizable components, and at the same time the metal of the body to be welded will be protected against absorption of such oxidizable components.

With this object in view the invention consists in a welding electrode having a rod of ferrous metal carrying a slag-forming material including ingredients for making a relatively light slag which is very fluid at the temperature to which it is subjected in the arc, which is basic as contradistinguished from a neutral slag, but only to a limited extent, just sufficient to have a restricted refining effect on the molten weld-metal, and which when setting has the properties of a blebby glass so as to maintain the insulating properties of the slag until the weld-metal has cooled, thereby annealing the latter, the slag when cold being very brittle, or friable, so as to be easily removed when the weld is finished. Such a slag-forming material is obtained by providing a composition which when in place on the electrode and under the influence of the arc will melt at about the melting point of the weld-rod metal and form a slag which may be figured as a ternary eutectic slag with a slight excess of one basic component, the excess being not greater than that required to form a eutectoid slag.

Coated welding rods embodying the present invention are illustrated in the accompanying drawing in which:

Fig. 1 is an elevation partly broken away illustrating a welding rod having a fibrous asbestos wrapping next the rod.

Fig. 2 a cross section of the completed rod shown in Fig. 1.

Fig. 3 an elevation similar to Fig. 1 showing an asbestos paper wrapping next the rod and Fig. 4 a cross section of the completed rod shown in Fig. 3.

In the most advantageous embodiments of the invention the coating composition includes iron oxide, silica, and a further basic oxide, or material which when heated will give a basic oxide, for example, a manganese compound, which is either manganese oxide, or a compound which when heated or melted will produce manganese oxide, the latter type of compound being most advantageous. Instead of a manganese compound other compounds may be used such as those of titanium, vanadium, zirconium, or molybdenum which may be either oxides or in such form as to produce oxides when heated in the presence of the other ingredients.

It is very important that the components of the coating be in the proper proportions to form a ternary eutectoid slag as distinguished from a true eutectic slag, and also there must be an additional ingredient serving as a flux and of such a nature and in such proportions as to make the slag very fluid when at the temperature attained in operation. Such a flux may be a potassium or a sodium compound, or a calcium or a barium compound.

It has been considered disadvantageous to employ barium as a constituent of the slag composition for an arc-welding rod, although it has been recognized as advantageous because it tends to make the arc self-regulating. The serious disadvantage is that certain barium compounds, like the carbonates and oxides have toxic properties that could affect the operator when welding. However, it may be used in limited quantity in the slag composition of the present invention, without serious danger, because it tends to combine with the other ingredients of the slag to form a type of barium glass thereby losing most, if not all, its toxic properties. Usually, the barium may be employed only for rods for special purposes. The proportions for the eutectoid slag are determined by figuring those for the ternary eutectic slag and adding an excess, not to exceed 67%, of one of the two basic components.

Where the composition selected is such as to form a ternary slag containing iron oxide, silica, and manganese oxide, with a flux, the proportions of the ingredients for the eutectic slag in the molten state will be substantially as follows:

|  | Percent |
|---|---|
| MnO | 15 |
| Silica | 40 |
| $Fe_2O_3$ | 45 |

In the present invention these figures designating the composition of the molten ternary eutectic slag, must be modified by the addition of the desired excess of one of the two basic oxides, which in the example given may be either MnO or $Fe_2O_3$. However, I have found that the silica should not exceed 46% of the total of the three ingredients, and in no case must the percentage figures for the basic oxide which is in excess exceed the corresponding figures for the same oxide in the eutectic by more than 11; the other basic oxide being correspondingly reduced and sometimes the silica changed. For example, where the eutectoid has the manganese oxide in excess, its percentage figures must not show more than 26% of the three ingredients, while the $Fe_2O_3$ must be reduced. Where the eutectoid is one having the $Fe_2O_3$ in excess, the percentage figures for the latter must not show more than 56% of the three indregients, the MnO being correspondingly reduced. The percentage of silica may be modified, but in the best embodiment of the invention is kept within about six percent plus or minus of the percentage figures for silica in the eutectic, that is within the range 34% to 46% in the eutectoid, the eutectic figure being substantially 40%.

On account of the possibility of modifying the percentages of the three slag forming ingredients without destroying the eutectoid properties of the molten slag, it becomes possible to adjust the slag composition to variations in the composition of the weld-rod, which is a great advantage. In practice it is advantageous to have the amount of silica in the molten slag above 35% figured on the three ingredients. As examples of slags which are suitable, the following are submitted:

|  | Percent |
|---|---|
| MnO | 24 |
| Silica | 46 |
| $Fe_2O_3$ or $FeOFe_2O_3$ | 30 |

MnO in excess

|  | Percent |
|---|---|
| MnO | 10 |
| Silica | 40 |
| $Fe_2O_3$ or $FeOFe_2O_3$ | 50 |

$Fe_2O_3$ or $FeOFe_2O_3$ in excess

As under the conditions of high temperature capable of being produced by the arc, some of the silica may tend to reduce, especially in the presence of the small amounts of carbon generally existing in the welding electrode, an excess of manganese oxide is used to reverse the reduction of the silica, and further, in order to assure that the variations in included iron oxide normally existing in all clean steels, do not cause the evolution of CO on re-melting of the electrode, I have found it advantageous to incorporate at times, a small amount of a metal which, at high temperatures, has a greater reducing action on the included oxide than has the carbon normally existing in the welding electrode and one which unites with the oxygen of the included oxide to form a solid rather than a gas and which will slag out as an excretion in the eutectoid slag.

For this purpose I have found a small amount of aluminum to be the most satisfactory—in amount not to exceed 5.5% of the total coating compound.

In like manner, an excess of iron oxide may be used to reverse the action of the silica and that this reaction may be confined to the slag, especially in the presence of carbon, and to prevent the evolution of CO by the reduction of included iron oxide, I likewise find it advisable at times, to incorporate in the formula a small amount of aluminum. In a slag including the said three ingredients in about the proportions stated, these will, when molten, form a ternary slag, which is a eutectoid, and hence will have a restricting oxidizing effect on the silica present, should the silica tend to disassociate, that is, there will be a tendency to oxidize any free silicon formed by disassociation of the silica in the slag and thus prevent the oxidation of the metal by interphase reaction and the absorption of an excessive amount of silica by the molten metal. In all cases the ternary compound is mixed with a flux in order to render the resulting slag very fluid, and whatever fluxing material is employed it should not contain any ingredients which will materially alter the ternary eutectoid compound.

Instead of manganese oxide, titanium oxide may be used, the latter being in excess of the amount necessary to form the true eutectic slag. In this case the relative percentage composition of the three ingredients should be such as to give in the molten slag.

|  | Percent |
|---|---|
| Iron oxide | 45 |
| Silica | 40 |
| Titanium oxide | 15 |

Where it is desired to obtain the best results, the composition is such that the manganese oxide is produced chiefly upon melting the slag, in which cases the raw materials used in making the slag-forming material comprise a manganese compound which when heated by the arc will give the desired oxide. Such compounds as amorphous hydrates of manganese or a carbonate of manganese are very advantageous, in which case the proportions in the composition of the raw materials are such as to give a molten slag of the percentage composition hereinbefore given.

In some cases the desired composition may be prepared in part from rock material or ore embodying some or all of the desired ingredients. For example, in order to make a slag-forming material containing iron oxide, silica and a manganese compound, the latter ingredient may be a selected psilomelane which consists chiefly of the hydrated oxides $MnO_2$ and MnO, these being accompanied by some barium oxide which is highly advantageous as a flux. In some cases the ore may contain constituents other than those required but generally these are in such very small amounts as to be negligible, or such as will be of a basic nature so as to combine with the silica when heated and thus will not be affected by or affect the molten weld-metal if the amount of silica is sufficient.

When using psilomelane as an ingredient of the composition it can be analyzed first and then the other ingredients, silica and iron oxide, added in the proper amounts to give substantially the proportions of the ingredients necessary to produce the eutectoid slag. Of course, in some cases the barium oxide in the psilomelane may not be present in sufficient amount to satisfy the requirements of this invention as to the necessary flux content to make a very fluid slag, wherefore it may be necessary to add additional fluxing material such as more alkaline earth or alkali compound. The formula for the slag employing manganese, given hereinbefore, may be followed when using psilomelane.

Instead of the amorphous hydrates or carbonates of manganese hereinbefore referred to, a suitable silicate of manganese, such, for example, as some of the natural minerals like Rhodonite, may be employed, allowance for the silica contained therein being made in determining the amount of silica to be added separately, the proportions of the ingredients being so selected as to give the eutectoid slag of substantially the percentage composition hereinbefore recited.

In place of Psilomelane or Rhodonite, there are other natural minerals containing manganese which may be selected, if desired, such, for example, as Rhodochrosite, a carbonate, Pyrolusite, an oxide manganese calcite, another carbonate and Tephroite, another silicate. In using these minerals, it is, of course, obvious that they must be selected so as not to contain any appreciable amount of impurities which would injure the eutectoid slag, for example, by materially raising the melting point of the composition.

Instead of employing psilomelane as explained above, there may be used ilmenite, a titanic iron ore comprising ferrous titanate. In this case silica and iron oxide may be added in sufficient amount to form the eutectoid slag. As one example the following formula may be used:

|  | Percent |
|---|---|
| Ilmenite | 32 |
| Silica | 40 |
| Iron oxide | 28 |

The slag-forming composition may be applied to the weld-rod in various ways. One well known way is to provide the rod with one or more grooves into which the said composition is inserted. Another way is to coat the rod either wholly or partly with the composition. However, in the most advantageous embodiment of the invention, the weld-rod is wrapped with a close winding of chrysotile asbestos, or asbestos paper, and the slag-forming material is then applied to the wrapping in a plastic condition and allowed to dry. To make the plastic material, the ingredients are ground finely, sifted if necessary, and mixed with a suitable amount of silicate of soda or water glass to form a paste. In practice the water glass may be used to the extent of 5 to 25 percent of the total slag composition.

The arc welding-rod of the type hereinbefore described may be made readily by machinery, the weld-rod A, Fig. 1 or $A^1$, Fig. 3, in long lengths being run through a mechanism which will wrap about it the fibrous asbestos, B, Fig. 1, or asbestos paper, $B^1$, Fig. 3, and then through a suitable mechanism for extruding the plastic coating composition onto the wrapped rod, which is finally passed through a smoothing die to finish the outer coating, C or $C^1$, and bring it to the predetermined size. However, instead of applying the coating by extrusion, it is more advantageous to apply it by dipping the rod into the coating composition and then drying the rods either in the open or in a dryer, it being unnecessary in this case to pass the rod through a smoothing die.

With a slag-forming composition adjusted to give the eutectoid slag, as hereinbefore described, some variations from the percentages given for examples may be made without departing from the spirit of the invention provided, however, the molten slag is substantially eutectoid.

What is claimed is:

1. An arc-welding electrode consisting of a weld-rod carrying a slag-forming material consisting of a mixture including a flux, silica, iron oxide and a manganese compound which when heated will react with silica, said silica, iron oxide, and manganese compound being in the following proportions relative to each other:

|  | Percent |
|---|---|
| Silica | 46 |
| Iron oxide | 30 |
| Manganese compound to give MnO | 24 | when melted by the arc, whereby a ternary eutectoid basic slag having a restricted refining effect on the molten weld-metal is formed, the flux including an alkaline-earth compound and being in such proportions relative to the other ingredients as to make the molten slag very fluid.

2. An arc-welding electrode consisting of a weld-rod carrying a slag-forming material consisting of a mixture including a flux, silica, iron oxide and a manganese compound which when heated will react with silica, said silica, iron oxide, and manganese compound being in the following proportions relative to each other:

|  | Percent |
|---|---|
| Silica | 46 |
| Iron oxide | 30 |
| Manganese compound to give MnO | 24 | when melted by the arc, whereby a ternary eutectoid basic slag having a restricted refining effect on the molten weld-metal is formed, the flux including an alkaline-earth compound in amount not less than 5 percent of the total of the slag ingredients so as to produce a very fluid molten slag.

3. An arc-welding electrode consisting of a weld-rod carrying a slag-forming material consisting of a mixture including a flux, silica, iron oxide and an amorphous manganese hydrate which when heated will form a manganese oxide, said silica, iron oxide, and manganese hydrate being in such proportions as to give when melted by the arc the following proportions relative to each other:

|  | Percent |
|---|---|
| Silica | 46 |
| Iron oxide | 30 |
| Manganese oxide | 24 | whereby a ternary eutectoid basic slag having a restricted refining effect on the molten weld-metal is formed, the flux including at least 5% of an oxide of an alkaline earth metal, figured on the total slag composition.

4. An arc-welding electrode consisting of a weld-rod carrying a slag-forming material consisting of a mixture including a flux, silica, iron oxide and an amorphous manganese hydrate which when heated will form a manganese oxide, said silica, iron oxide, and manganese hydrate being in such proportions as to give when melted by the arc the following proportions relative to each other:

|  | Percent |
|---|---|
| Silica | 46 |
| Iron oxide | 30 |
| Manganese oxide | 24 | whereby a ternary eutectoid basic slag having a restricted refining effect on the molten weld-metal is formed, the flux including at least 5% of barium oxide, figured on the total slag composition.

5. An arc-welding electrode consisting of a weld-rod carrying a slag-forming material consisting of a mixture including a flux, silica, iron oxide and a titanium compound which when heated will react with silica, said silica, iron oxide, and titanium compound being in the following proportions relative to each other,

| | Percent |
|---|---|
| Silica | 40 |
| Iron oxide | 45 |
| Titanium compound to give $TiO_2$ | 15 | when melted by the arc, whereby a ternary eutectoid basic slag having a restricted refining effect on the molten weld-metal is formed, the flux including an alkaline-earth compound in amount not less than 5 percent of the total of the slag ingredients so as to produce a very fluid molten slag.

6. An arc-welding electrode having a weld-rod carrying a coating consisting of a flux and a mixture consisting of three slag-forming ingredients, these three ingredients being silica and two different basic metallic oxides each capable of reacting with said silica, one basic oxide being present in excess of the proportion necessary to form with the other oxide and the silica a ternary eutectic slag, such excess being not more than 11% of the total of the said three ingredients, the other basic oxide being present in a proportion less than sufficient to form said ternary eutectic slag, the silica being not less than 34% and not more than 46% of the total of the three ingredients.

7. An arc-welding electrode having a weld-rod carrying a coating consisting of a flux and a mixture consisting of three slag-forming ingredients, these three ingredients being silica, iron oxide and another basic metallic oxide capable of reacting with silica, one of said two oxides being present in excess of the proportion necessary to form with the other oxide and the silica a ternary eutectic slag, such excess being not more than 11% of the total of the said three ingredients, the other basic oxide being present in a proportion less than sufficient to form said ternary eutectic slag, the silica being not less than 34% and not more than 46% of the total of the three ingredients.

ROBERT S. JOHNSTON.